(12) United States Patent
Zhu et al.

(10) Patent No.: US 10,719,469 B2
(45) Date of Patent: Jul. 21, 2020

(54) INBAND MESSAGING METHOD FOR INTEGRATED TYPE-C UNIVERSAL SERIAL BUS DETECTION USING ENHANCED SERIAL PERIPHERAL INTERCONNECT

(71) Applicant: Intel Corporation, Santa Clara, CA (US)

(72) Inventors: Zhenyu Zhu, Folsom, CA (US); Mikal C Hunsaker, El Dorado Hills, CA (US); Christopher J. Lake, Folsom, CA (US); Kie Woon Lim, Bayan Lepas (MY)

(73) Assignee: INTEL CORPORATION, Santa Clara, CA (US)

( * ) Notice: Subject to any disclaimer, the term of this patent is extended or adjusted under 35 U.S.C. 154(b) by 177 days.

(21) Appl. No.: 15/445,592

(22) Filed: Feb. 28, 2017

(65) Prior Publication Data
US 2018/0246830 A1    Aug. 30, 2018

(51) Int. Cl.
*G06F 13/38* (2006.01)
*G06F 13/364* (2006.01)
*G06F 13/42* (2006.01)
*G06F 13/40* (2006.01)

(52) U.S. Cl.
CPC .......... *G06F 13/385* (2013.01); *G06F 13/364* (2013.01); *G06F 13/404* (2013.01); *G06F 13/4282* (2013.01)

(58) Field of Classification Search
CPC . G06F 11/3051; G06F 13/4295; G06F 13/387
See application file for complete search history.

(56) References Cited

U.S. PATENT DOCUMENTS

| | | | | |
|---|---|---|---|---|
| 2005/0080932 A1* | 4/2005 | Liu | ................... | H04N 1/00127 709/249 |
| 2006/0143348 A1* | 6/2006 | Wilson | ............... | G06F 13/4291 710/110 |
| 2007/0112997 A1* | 5/2007 | Watanabe | ......... | H04N 1/00236 710/313 |
| 2014/0040513 A1* | 2/2014 | Weiser | .................. | G06F 13/38 710/38 |
| 2014/0115212 A1* | 4/2014 | Kazuno | .............. | G06F 13/4291 710/110 |
| 2015/0052360 A1* | 2/2015 | Ravishankar | ....... | H04L 63/0428 713/171 |

(Continued)

OTHER PUBLICATIONS

"Enhanced Serial Peripheral Interface (eSPI), Interface Base Specification (for Client and Server Platforms)," Intel, Revision 1.0, 2016, 130 pages.

(Continued)

*Primary Examiner* — Getente A Yimer
(74) *Attorney, Agent, or Firm* — NDWE, LLP

(57) ABSTRACT

A method implemented by a system on a chip (SOC) system executing an enhance serial peripheral interconnect (eSPI) master. The method to receive an alert from an eSPI slave, send a get out of band message to the eSPI slave, and receive an out of band message from the eSPI slave including a connection or disconnection command. The method enabling the SOC to include an embedded multiplexor for managing the role of a universal serial bus (USB) Type-C connector.

15 Claims, 9 Drawing Sheets

(56) References Cited

U.S. PATENT DOCUMENTS

| | | | |
|---|---|---|---|
| 2016/0179648 A1* | 6/2016 | Srivastava | G06F 11/3051 |
| | | | 710/16 |
| 2016/0188348 A1* | 6/2016 | Hung | G06F 9/4411 |
| | | | 710/302 |
| 2016/0283433 A1* | 9/2016 | Nair | G06F 13/4282 |
| 2017/0201886 A1* | 7/2017 | Yang | H04L 9/0841 |

OTHER PUBLICATIONS

IEEE 802.11b—1999: "Higher Speed Physical Layer (PHY) Extension in the 2.4 GHz Band," IEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.

IEEE Std 802.11—2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.

IEEE Std 802.11a—1999(R2003): "Part 11: Wireless LAN Medium Access Control (MAC) and Physical Layer (PHY) Specifications, High-speed Physical Layer in the 5 GHz Band," IEEE Standard for Information technology—Telecommunications and information exchange between systems, Local and metropolitan area networks—Specific requirements, reaffirmed Jun. 12, 2003, copyright 1999, 91 pages.

IEEE Std 802.11ac—2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

IEEE Std 802.11g—2003: "Part 11: Wireless LAN Medium Access Control (MAC) and Physical Layer (PHY) Specifications, Amendment 4: Further Higher Data Rate Extension in the 2.4 GHz Band," IEEE Standard for Information technology—Telecommunications and information exchange between systems, Local and metropolitan area networks—Specific requirements, Jun. 27, 2003, 78 pages.

IEEE Std 802.11n—2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.

JEDEC Standard, "Low Power Double Data Rate 2 (LPDDR2)," JESD209-2E (Revision of JESD209-2D, Dec. 2010), JEDEC Solid State Technology Association, Apr. 2011, 284 pages.

PCI Express® Base Specification Revision 3.0, Nov. 10, 2010, 860 pages.

TPM Main Part 1 "Design Principles," Specification Version 1.2, Revision 62, TCG Copyright, Oct. 2, 2003, 161 pages.

TPM Main Part 2 "TPM Structures," Specification Version 1.2, Revision 62, TCG Published, Oct. 2, 2003, 176 pages.

"Universal Serial Bus Power Delivery Specification," Revision 3.0, V1.0a, Mar. 25, 2016, 513 pages.

"Universal Serial Bus Type-C Cable and Connector Specification," Release 1.2, Mar. 25, 2016, 221 pages.

Wigig White Paper, Wireless Gigabit Alliance, Defining the Future of Multi-Gigabit Wireless Communications, Jul. 2010, 5 pages.

\* cited by examiner

Memory Write 32 Requests

|   | 7 | 6 | 5 | 4 | 3 | 2 | 1 | 0 |
|---|---|---|---|---|---|---|---|---|
| 0 | colspan=8 | eSPI Cycle Type: OOB Message = 21h |||||||
| 1 | Tag[3:0] |||| Length[11:8] = 0h ||||
| 2 | Length[7:0] =5 ||||||||
| 3 | Dest Slave Addr [7:1] = 07h (eSPI slave 0/EC) ||||||| 0 |
| 4 | Command Code = 08h (USB Command) ||||||||
| 5 | Byte Count = 2 ||||||||
| 6 | Source Slave Address [7:1] =10h (PCH) ||||||| 1 |
| 7 | Usages = 03h (Port Status Notification Response) ||||||||
| 8 | USB Response/Error Status ||||||||

FIG. 6A

|   | 7 | 6 | 5 | 4 | 3 | 2 | 1 | 0 |
|---|---|---|---|---|---|---|---|---|
| 0 | eSPI Cycle Type: OOB Message = 21h ||||||||
| 1 | Tag[3:0] |||| Length[11:8] = 0h ||||
| 2 | Length[7:0] =2* N+6 ||||||||
| 3 | Dest Slave Addr [7:1] = 10h (PCH) ||||||| 0 |
| 4 | Command Code = 08h (USB Command) ||||||||
| 5 | Byte Count = 2* N+3 ||||||||
| 6 | Source Slave Address [7:1] = 07h (eSPI Slave 0/ ||||||| 1 |
| 7 | Usages = 02h (Port Status Notification) ||||||||
| 8 | Port Number 1 (5 bits) ||||||||
| 9 | Port Role |||||| Ori | Vbus |

FIG. 6B

INBAND MESSAGING METHOD FOR INTEGRATED TYPE-C UNIVERSAL SERIAL BUS DETECTION USING ENHANCED SERIAL PERIPHERAL INTERCONNECT

TECHNICAL FIELD

Embodiments of the invention relate to the field of interconnections for computing devices; and more specifically, to the operations of universal serial buses in detecting connected devices.

BACKGROUND

The serial peripheral interconnect (SPI) is an interface bus utilized for exchanging data between microcontrollers and small peripheral devices. These peripheral devices can include registers, sensors, memory cards, and similar devices. The SPI bus is generally suitable for short distance communication. The SPI bus is a synchronous serial interface and a four wire bus. A successor to SPI is call enhanced SPI (eSPI) and enables a reduction in the number of pins required on motherboards in comparison with prior standards. eSPI provides greater throughput and reduces the working voltage required for operation.

The universal serial bus (USB) standard is a standard that defines cables, connections and communication protocols used for connection, communication and power supply between electronic devices. The USB standard has evolved over time to utilize various connector types and support varying features. Amongst these USB standards is the USB type-C standard that defines a reversible plug connector for USB devices. The Type-C plug connects to electronic devices that function as both hosts and connected devices.

Connecting an electronic device to a host device such as computing system having a motherboard, central processing unit (CPU) and similar components encompasses having circuitry that detects the connection of the electronic device. Where a device is connected via a USB Type-C connector port, there is circuitry that detects the connection of a cable and electronic device to the connector port. This enables the software and circuitry that manage the USB communication protocols to initiate communication and power controls for the connected device. This detection circuitry is placed on the motherboard and adds cost and complexity to the motherboard configuration and design.

BRIEF DESCRIPTION OF THE DRAWINGS

The present disclosure is illustrated by way of example and not limitation in the figures of the accompanying drawings, in which like references indicate similar elements and in which:

FIG. 6A is a diagram of one embodiment of the packet format for a universal serial bus (USB) port connectivity or role status change notification.

FIG. 6B is a diagram of one embodiment of the packet format for a USB port connectivity or role status change response.

DETAILED DESCRIPTION

Figure 1A:
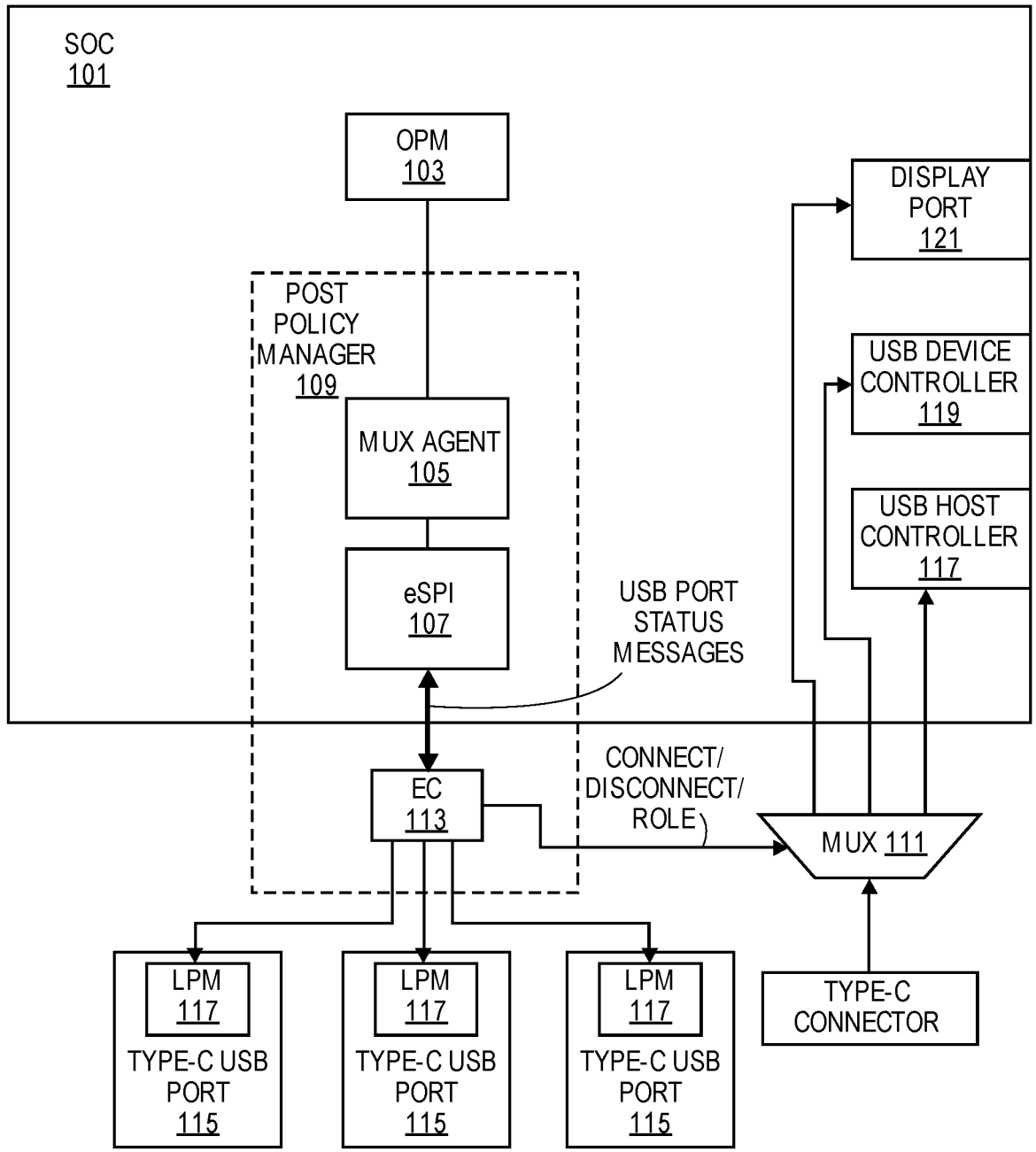
FIG. 1A is a diagram of one embodiment of a computing system with an architecture with connection detection components on the motherboard.

The embodiments provide a set of processes and mechanisms that enable the tunneling of universal serial bus (USB) connection or disconnection messages via the enhanced serial peripheral interface (eSPI) to enable in-band control and notification between a USB Type-C policy manager and the platform controller hub (PCH). This enables the integration of the USB multiplexor into the PCH to provide more programmable controls for handling USB Type-C connections, while lower the platform cost due to eliminating the need for a multiplexor on the mother board. Including the USB multiplexor in the PCH avoids the need for additional pins on the embedded controller and PCH or the need to add a multiplexor that is external to the PCH and placed on the mother board. The use of in-band messages as described in the embodiments supports more scalable platforms that requires different numbers of USB ports. The embodiments can be extended for future USB port types and related technologies.

In the following description, numerous specific details are set forth. However, it is understood that embodiments of the disclosure may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Electronics (e.g., computing systems) generally employ one or more electrical connections (e.g., wired or wireless connections) to facilitate the transmission and reception of data (e.g., communication) between devices, such as, but not limited to, between a computing system (e.g., a computer including a hardware processor) and a (e.g., external) peripheral. Non-limiting examples of peripherals are external storage devices (e.g., hard disk drives) and mobile devices (e.g., smartphones and tablets).

Certain electrical connections (e.g., couplings) include parallel conductors (e.g., parallel wires or other electrically conductive paths). One embodiment of an electrical connection is a bus. One embodiment of a bus is a multiple conductor bus, for example, where the conductors (e.g., wires) allow parallel (e.g., concurrent) transmittal of data thereon. The term electrical connection (e.g., bus) may generally refer to one or more separate physical connections, communication lines and/or interfaces, shared connections, and/or point-to-point connections, which may be connected by appropriate bridges, hubs, adapters, and/or controllers. A serial bus (e.g., serial bus architecture) may generally refer to a (e.g., shared) communication channel that transmits data one bit after another (e.g., sequentially), for example, over a (e.g., each) single wire or fiber.

As used herein, the phrase Universal Serial Bus (USB) generally refers to a specification(s) for a serial bus that supports the transmission and reception of data (e.g., and power and/or control) between a downstream facing port (e.g., a host) and a one or more upstream facing ports (e.g., devices), for example, through one or more hubs there between.

FIG. 1A is a diagram of one embodiment of a computing system with an architecture with connection detection components on the motherboard. The computing system is illustrated with abstraction to show those components relevant to the processes for handling USB Type-C connections and in particular the communication between the enhance serial peripheral interconnect (eSPI) and the embedded controller (EC) that support the USB Type-C platform.

The system includes a system on a chip (SOC) 101 that includes a processor or set of processors and internal interconnects that are illustrated in further embodiments below with regard to FIGS. 7 and 8, which illustrate and describe the hardware components of SOCs. A 'set,' as used herein refers to any positive whole number of items including one item. The processors of the SOC execute an operating system (OS) policy manager (OPM) 103 that communicates OS based requests to the USB Type-C connector/device and receives the same. The OPM is in communication with the platform policy manager (PPM) 109, which manages USB Type-C ports of the computer system and applies system and power delivery policies.

The PPM 109 includes a multiplexor (mux) agent 105 that manages the communication with a discrete external multiplexor 111 to enable a display port 121, USB device controller 119 and USB host controller 117 to communicate with a set of Type-C USB ports 115 via an embedded controller (EC) 113 and more specifically to enable disconnection or connection messages from link policy managers (LPMs) at the Type-C ports or connectors 115 to be conveyed to the OPM 103. The computing system in which a set of Type-C ports or connectors 115 are present may include any number of such ports or connectors. However, an EC can only connect with four connectors, where there are four or more connectors, the external multiplexor 111 is utilized.

The PPM includes an enhance serial peripheral interconnect (eSPI) that manages port status communication messages between the ports or connectors 115 and the PPM 109. The ports may implement a LPM 117 that manages status information at the port that can be retrieved by the EC. The mux agent 105 communicates via eSPI with the external multiplexor 111. An external multiplexor 111 may be placed on a mother board or in a similar location and this adds cost and complexity to the mother board manufacturing. If there are additional Type-C connectors, then a separate multiplexor or a more complex multiplexor must be utilized to accommodate the additional Type-C connectors.

The display port 121 is a component for managing communication with an external monitor that may be connected to a given Type-C port or connector 115. A USB device controller 119 and USB host controller 117 manage general USB compliant communication where the computing system functions as a device or host, respectively. Each of these functions must be supported for each Type-C connector or port.

Figure 1B:
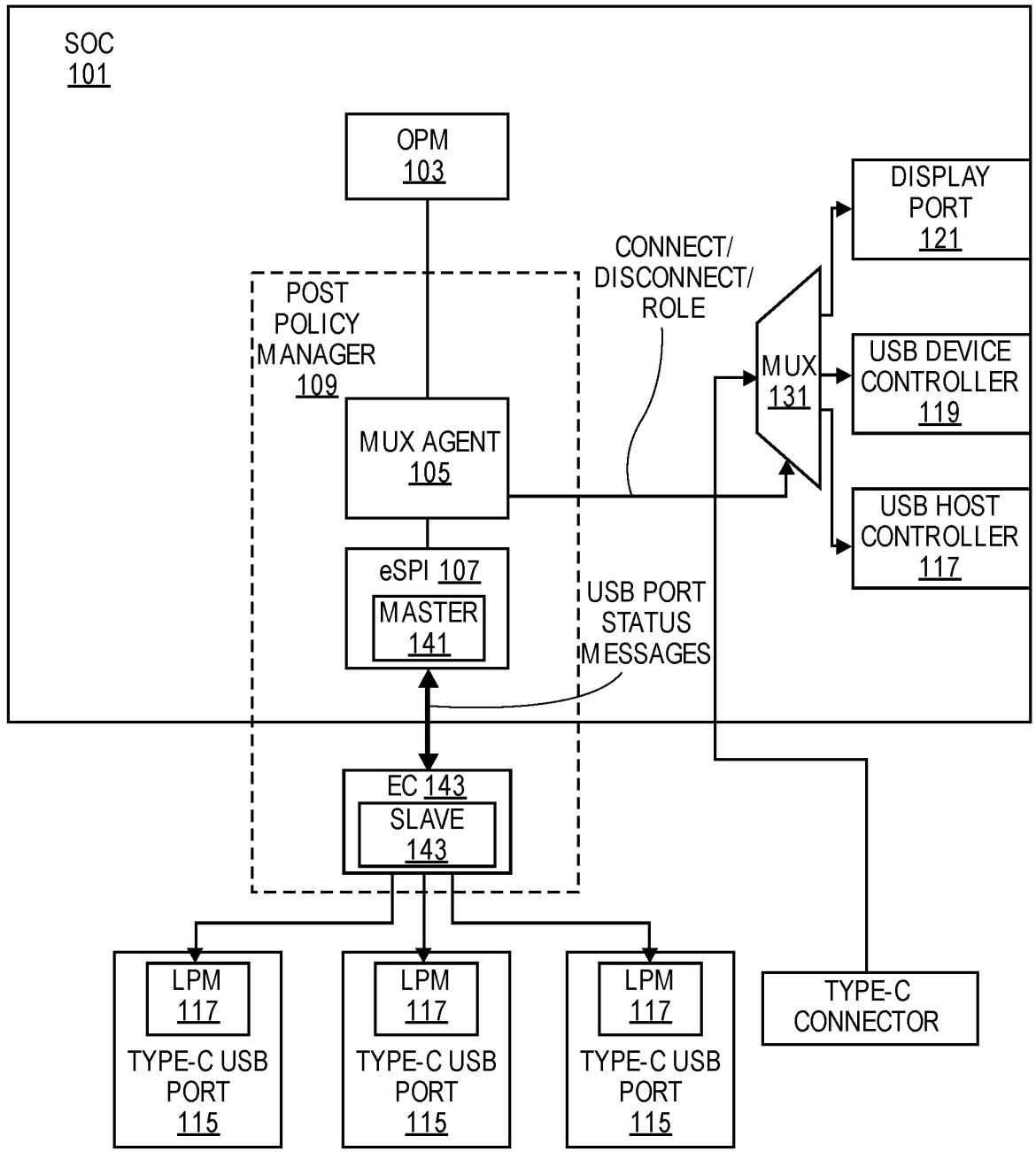
FIG. 1B is a diagram of one embodiment of a computing system with an architecture with connection detection components within a system on a chip (SOC).

FIG. 1B is a diagram of one embodiment of a computing system with an architecture with connection detection components within the SOC. The computing system is illustrated with abstraction to show those components relevant to the processes for the communication between the eSPI and the EC. In this embodiment, no external multiplexor is needed and instead an internal multiplexor 131 is utilized within the SOC 101. This reduces the cost for mother board manufacturers and reduces the complexity of the mother boards. The mux agent 105 is able to directly control the operation of the internal multiplexor 131 to enable communication between the display port 121, USB device controller 119 and USB host controller 117 depending on the role of the associated USB Type-C connector.

In this embodiment, the eSPI master 141 function has been modified to support in-band communication related to connection and disconnection messages that enables the external multiplexor to be placed internal to the SOC. The external multiplexor is no longer needed to convey the connection and disconnection information to the EC and PPM. The processes of the eSPI master 141 and the eSPI slave 143 are described further herein below with regard to FIGS. 3 and 4.

Figure 2:
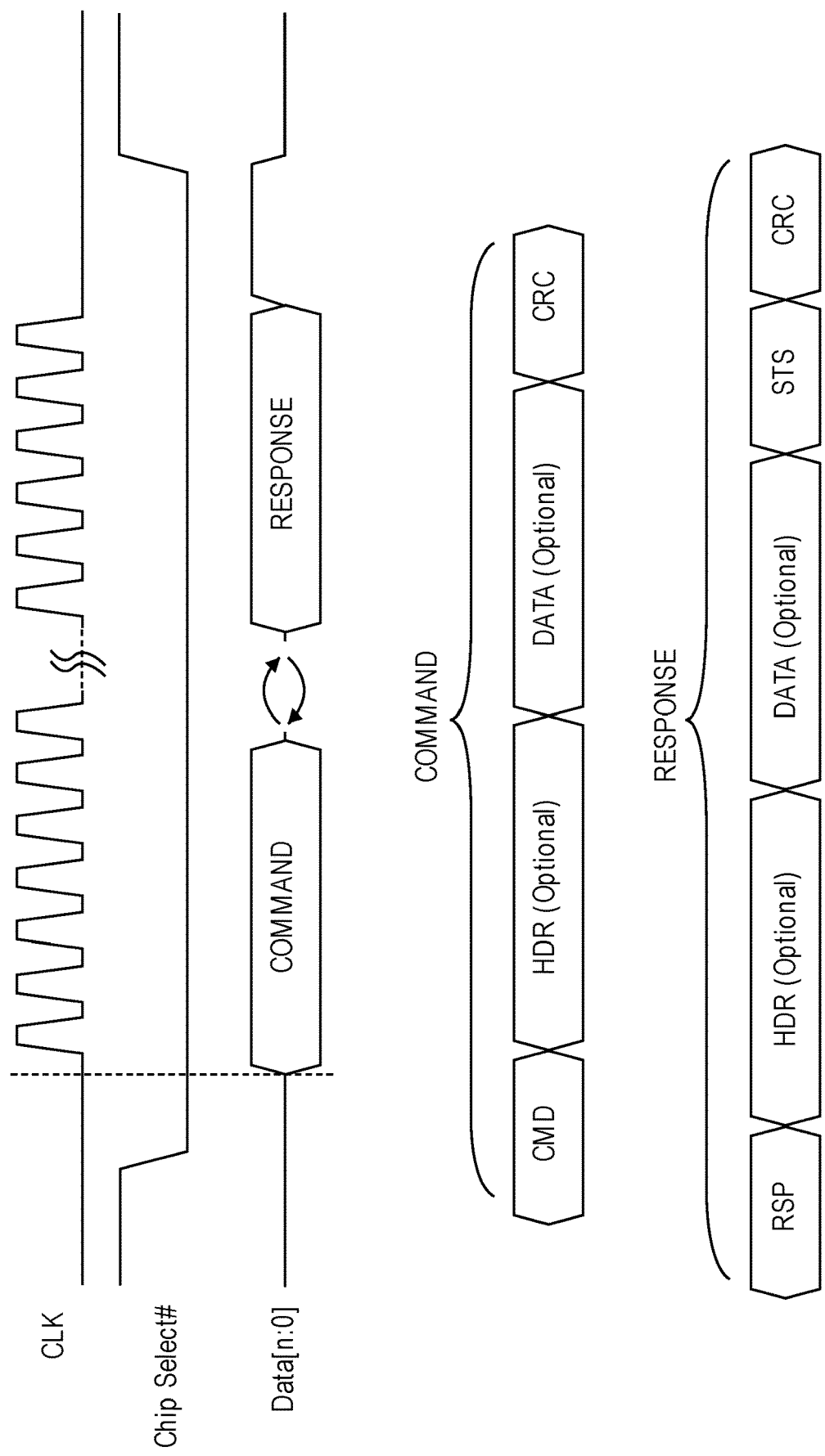
FIG. 2 is a diagram of one embodiment of the enhanced serial peripheral interface (eSPI) protocol.

FIG. 2 is a diagram of one embodiment of the enhanced serial peripheral interface (eSPI) protocol. The basics of the eSPI protocol are described in relation to FIG. 2. The electrical of the eSPI bus is similar to SPI bus. The protocol relies on a serial clock signal. The protocol is a communication between an eSPI master and an eSPI slave. The first data is sent by the eSPI master while the serial clock is low and sampled on the first rising edge of the clock by the eSPI slave. Subsequent data is sent on the falling edge of the clock from the eSPI master and sampled on the rising edge of the clock by eSPI slave. The data is sent from the eSPI slave on the falling edge of the clock.

eSPI transactions consists of a Command phase driven by the eSPI master, a Turn-Around (TAR) phase, and a Response phase driven by the eSPI slave. The Command phase consists of a command (CMD), an optional header (HDR), optional DATA and a cyclic redundancy check (CRC). The Response phase consists of a response (RSP), an optional header (HDR), optional data, a Status and a CRC. CRC generation is mandatory for all eSPI transactions where a CRC byte is always transmitted on the bus. However, CRC checking is default disabled after reset and it is enabled by SET CONFIGURATION. When CRC checking is disabled, CRC byte is ignored by the receiver.

A transaction could be initiated by the eSPI master through the assertion of Chip Select#, starting the clock and by driving the command onto the data bus. The clock remains toggling until the complete response phase has been received from the slaves. A transaction can be initiated by the eSPI slave by first signaling an Alert event to the master. The Alert event could be signaled through two ways. In the Single MasterSingle Slave configuration, the input/output (I/O) pin could be used by the slave to indicate an Alert event. In the Single Master-Multiple Slaves configuration, a dedicated Alert# pin is required. The Alert event can only be signaled by the slave when the slave's Chip Select# is high. When I/O is used to signal the Alert# event, it is toggled from tri-state to pulled low by the eSPI slave when the slave decides to request for service. The slave then holds the state of the I/O pin until the Chip Select# is asserted by the eSPI master. Once the Chip Select# is asserted, the eSPI slave must release the ownership of the I/O pin by tri-stating the pin within a specific timing and the pin will be pulled high by the weak pull-up. The basic signaling protocol is further defined by the Enhanced Serial Peripheral Interface (eSPI) specification, January 2016, Revision 1.0 and similar documents. The processes for eSPI in-band connection and disconnection signaling are modifications of these signaling protocols. The transaction layer description of the general eSPI packet format are described with regard to FIG. 5. Out of band messages can be encapsulated with the command and response messages within the respective data portions of each. Examples of out of band messages for connection and/or disconnection messages are described with relation to with relation to FIGS. 6A and 6B.

Figure 3:
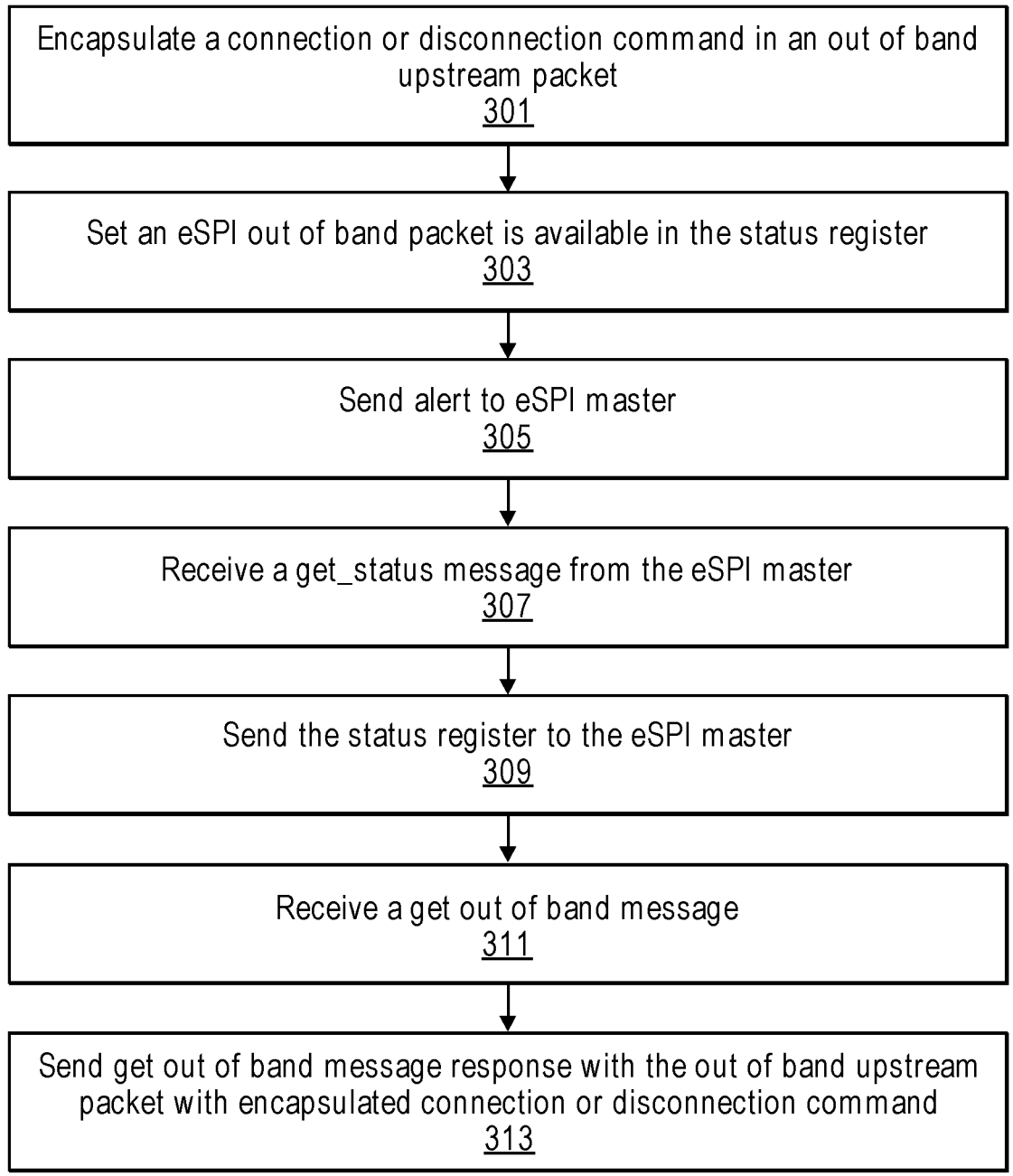
FIG. 3 is a flowchart of one embodiment of a process for handling disconnection or connection commands by the eSPI slave.

FIG. 3 is a flowchart of one embodiment of a process for handling disconnection or connection commands by the eSPI slave. In one embodiment, the process for signaling a connection or disconnection is initiated by the eSPI slave. The eSPI slave encapsulates the connection or disconnection command in an in-band upstream packet (Block 301). The connection or disconnection command can be separate command types or can be variants of the same command. The eSPI slave then sets an eSPI out of band packet is available in the status register (Block 303). The eSPI slave then sends an Alert to the eSPI master (Block 305). This causes the eSPI master to attempt to determine what is the cause of the Alert. The eSPI master will send a get status message to the eSPI master (Block 307). Other actions may be taken by the eSPI master to determine the cause of the alert, but these are not directly relevant to this process.

In response to the get status message, the eSPI slave sends a status register as a response to the eSPI master (Block 309). The eSPI master then sends a get out of band message to the eSPI slave (Block 311). Upon receiving the get out of band message, the eSPI slave sends a get out of band message response with the out of band upstream packet that contains the encapsulated connection or disconnection command to the eSPI master (Block 313).

Figure 4:
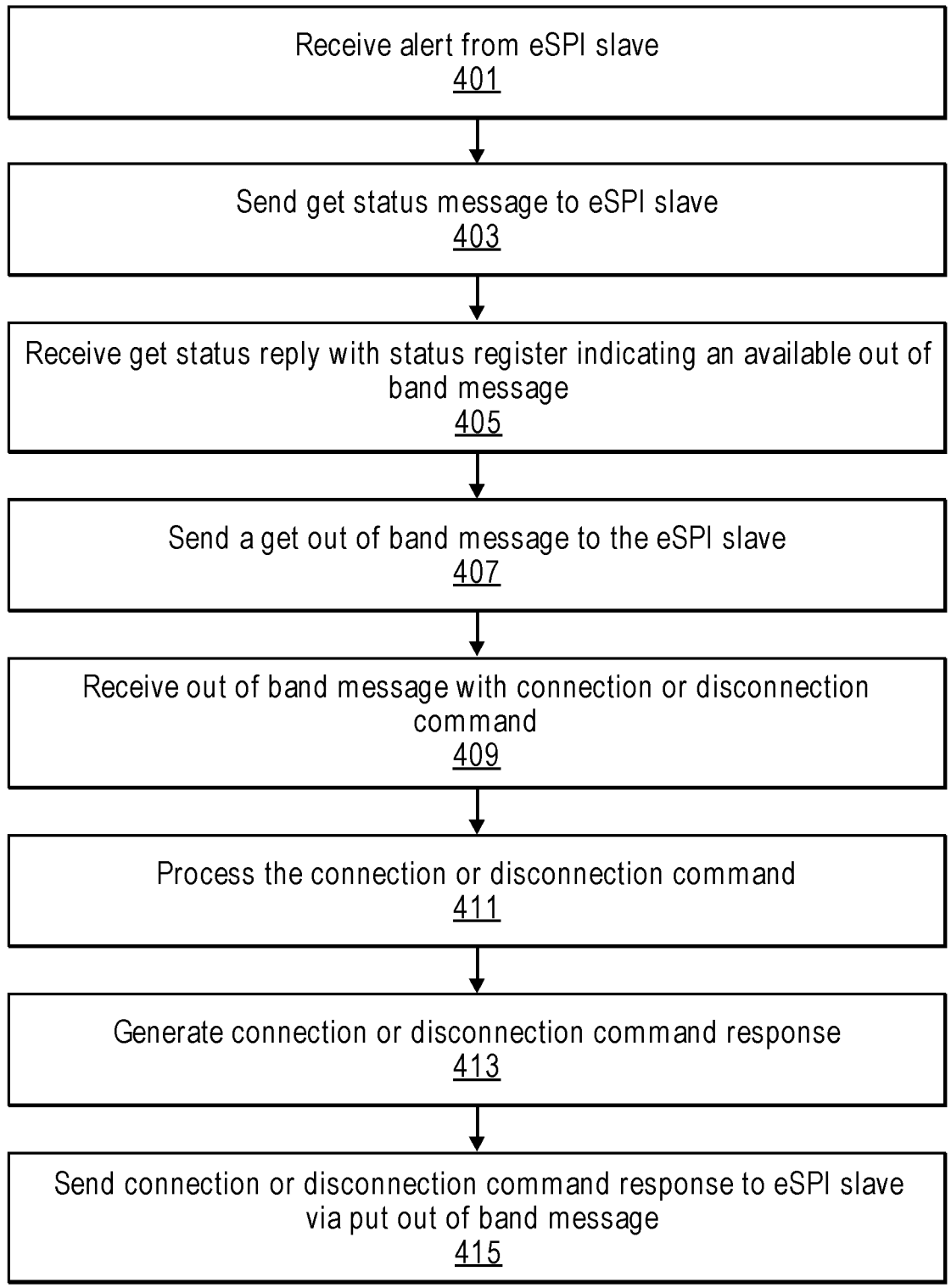
FIG. 4 is a flowchart of one embodiment of a process for handling disconnection or connection commands by the eSPI master.

FIG. 4 is a flowchart of one embodiment of a process for handling disconnection or connection commands by the eSPI master. The eSPI master responds to receiving an alert signal from the eSPI slaves (Block 401). The eSPI master may iterate through a set of operations to determine the cause of the alert received from the eSPI slave. The eSPI master sends a get status message to the eSPI slave to determine whether the status register contains information that identifies the cause of the alter (Block 403). The eSPI slave then sends a response in the form of a get status reply message that includes a copy of the status register of the eSPI slave (Block 405). Examination of the status register shows that a status indicator for the availability of an out of band message has been set.

The eSPI master then sends a get out of band message to the eSPI slave (Block 407) to obtain the available out of band message. The eSPI slave responds by sending the out of band message with a connection and/or disconnection command in the data section (Block 409). The eSPI master then processes the connection and/or disconnection command to determine whether a OPM, mux agent, or similar functions should be notified of the connection or disconnection of a device at the corresponding USB Type-C port or connector (Block 411). Such a notification can be sent to those components. In addition, the eSPI master generates a connection and/or disconnection command response (Block 413). The eSPI master then sends the generated connection and/or disconnection command response to the eSPI slave via an out of band message (Block 415).

Figure 5:
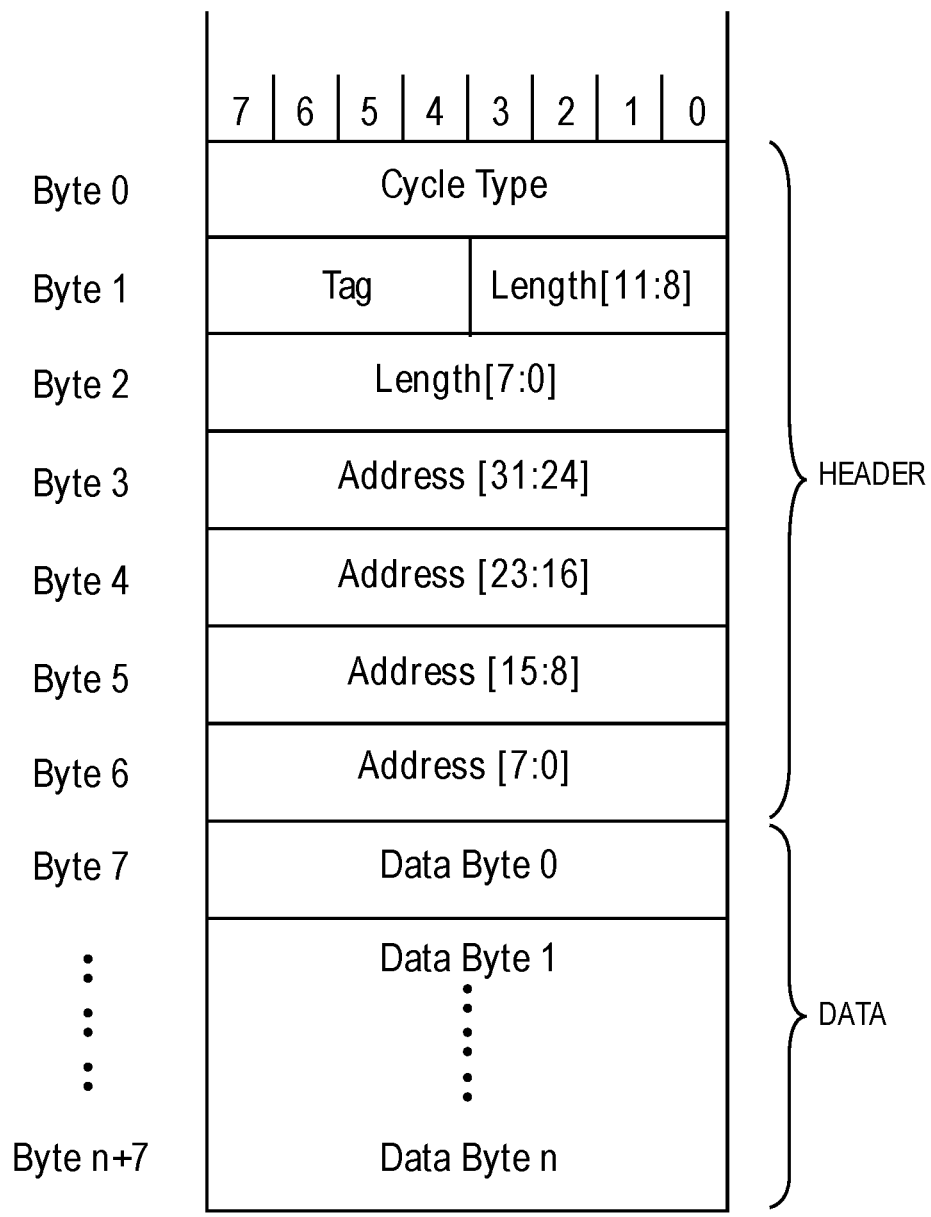
FIG. 5 is a diagram of one embodiment of the general eSPI packet format.

FIG. 5 is a diagram of one embodiment of the general eSPI packet format. The following diagram shows a general Enhanced Serial Peripheral Interface (eSPI) packet format. The general packet includes a cycle type, tag, length and address in the header. The data can have various size or content.

The cycle types supported over the eSPI interface is shown in the Enhanced Serial Peripheral Interface (eSPI) specification, January 2016, Revision 1.0 and similar documents. The Least-Significant-Bit (LSB) of the encodings distinguishes between a cycle with data and a cycle without data. The direction of cycle type supported is specified as "Up" or "Down." "Up" refers to the direction from eSPI slave to eSPI master and "Down" refers to the direction from eSPI master to eSPI slave.

The Tag field is allowed to be non-unique for multiple outstanding non-posted requests on the same Channel that require completion. The 4-bit Tag field allows up to 16 unique non-posted requests to be outstanding at any one time which have no ordering requirement among each other. The length field indicates the request size or data payload specified in Bytes. The length field is 1-based. A value of all zeros indicates 4 KB of length. For memory read and Flash Read, the length field specifies the data payload size requested. For memory write, Flash write, OOB message with data and Completion with Data, the length field specifies the actual amount of data returned in the packet.

For an out of band message with data, data payload size must not exceed the Maximum Payload Size of the respective channel with no address alignment requirement. The data payload of the OOB message affected by the Maximum Payload Size is the actual payload of the protocol embedded in the message itself.

The address field supports both 32-bit and 64-bit addressing formats. For peripheral channel I/O cycles, only 16-bits address is used. For addresses below 4 GB, the memory transactions must use the 32-bit addressing A data field includes a payload dependent on the message cycle type.

FIG. 6A is a diagram of one embodiment of the packet format for a universal serial bus (USB) port connectivity or role status change notification. This is a eSPI master to eSPI slave message for USB port connectivity or role status change notification response. This packet is an eSPI packet with cycle type of an out of band (OOB) message. Any tag can be utilized. The length identifies the size of the data section. Addresses include the destination eSPI slave. A command code is included indicating a USB code. The source eSPI slave address is also included. The data section includes the port status notification response and USB response or error status.

FIG. 6B is a diagram of one embodiment of the packet format for a USB port connectivity or role status change response. This is an eSPI slave to eSPI master message for USB port connectivity or role status change notification. This packet is an eSPI packet with cycle type of an OOB message. Any tag can be utilized. The length identifies the size of the data section. Addresses include the destination eSPI slave. A command code is included indicating a USB code. The source eSPI slave address is also included. The data section includes the port status notification, port number and port role information.

In certain embodiments, a first device may connect to a second device through a (e.g., wired) electrical connection, for example, a serial bus cable having multiple conductors (e.g., wires). A cable may include a plug, e.g., on each end thereof. A receptacle of a device (or a plug of a device) may receive a plug (or receptacle) coupled to another device. In one embodiment, a plug may be received (e.g., inserted) into a receptacle in a plurality of orientations, for example, flipped from one orientation to another orientation, e.g., and retain its (e.g., full) functions. This may be referred to as "flip-ability", e.g., flip-able between a right-side up position and an upside-down position.

Certain embodiments (for example, with one or more flip-able plug and receptacle pairs) may allow a first device and/or a second device to toggle between different roles, for example, as the devices wait for a physical connection to be made and each device's role to be established, e.g., in contrast to a connector's type defining a role, such as a type-A USB connector being a host (data master) role and a type-B USB connector being a slave (data recipient) role. In certain embodiments herein, a first device may be in a first role (e.g., an upstream facing data port role, downstream facing data port role, power source role, and/or power sink role) and a second device in a second (e.g., same or different than the first) role (e.g., an upstream facing data port role, downstream facing data port role, power source role, and/or power sink role). In one embodiment, a device (e.g., a circuit thereof) presents itself (e.g., during initial attachment) as a first of a plurality of roles, then changes to a second of a plurality of roles, etc. In one embodiment, a device (e.g., a circuit thereof) presents itself (e.g., during initial attachment) as a first role, then toggles to a second role, then back to the first role, for example, and continues to do so, e.g., until the other device acknowledges that role (e.g., via an acknowledgement signal). For example, a current USB Type-C specification (e.g., revision 1.2 of Mar. 25, 2016) and a current USB Power Delivery specification (e.g., revision 3.0, version 1.0a of Mar. 25, 2016) includes an upstream facing data port role (e.g., a host) and a downstream facing data port role for each device (e.g., a USB device) and/or a power source role and a power sink role. In one embodiment, a device in the power source role (e.g., that acquires the power source role) is also in the downstream facing data port role, for example, until an operation is performed to swap one or more of the device's roles (e.g., to perform a power role swap to swap the current power role but retain the current data role, to perform a data role swap to swap the current data role but retain the current power role, or to perform a role swap of both the data and power roles). In one embodiment, a device in the power sink role (e.g., that acquires the power sink role) is also in the upstream facing data port role, for example, until an operation is performed to swap one or more of the device's roles (e.g., to perform a power role swap to swap the current power role but retain the current data role, to perform a data role swap to swap the current data role but retain the current power role, or to perform a role swap of both the data and power roles).

In certain embodiments, a first device with multiple (e.g., dual) roles may connect to a second device with multiple (e.g., dual) roles (for example, where each device's role is not defined by the connector (e.g., a plug or receptacle thereof) type, e.g., two devices connected by a cable that has the same plug at each end). In embodiments, each device may present itself in the same role, for example, where the devices do not connect to each other, e.g., do not connect from a user's perspective or with respect to a communication protocol (for example, electrically and/or physically connected devices that do not allow data and/or power transmission or reception, e.g., other than communications to define a device's role). Certain devices (e.g., operating according to specification(s) or industry standards) do not have predefined roles, for example, each device is to establish its role, for example, or it does not function, e.g., to transmit and receive data and/or source and sink power. Certain devices (e.g., operating according to specification(s) or industry standards) do not define device role(s), for example, in the point-to-point connection by the connector type, e.g., to accept and provide power and/or data with an externally connected device (e.g., a laptop connected to phone, a laptop connected to an external (e.g., USB drive), a phone connected to tablet, etc.).

For example, each device of a plurality of devices may include a same connector (e.g., plug or receptacle thereof), for example, such that circuitry is to cause signaling (e.g., between connected devices) while the connections are physically made (e.g., during an initialization phase) in order to define the role(s) of each device, for example, one device as a host and another device as a slave and/or one device as a power source (e.g., provider) and another device as the power sink (e.g., consumer). In certain embodiments, devices that toggle (e.g., switch) between either of a plurality of roles (e.g., a dual role device) are to toggle (e.g., via a toggling circuit) back and forth between a plurality of roles, for example, (e.g., only) between an upstream facing data port role (e.g., slave or device role) and a downstream facing data port role (e.g., host role). Device(s) may toggle between a plurality of roles until a specific (e.g., stable) state is established, for example, during a connection process (e.g., initial attach). A multiple (e.g., dual) role device may connect to a fixed role device or another multiple (e.g., dual) role device. In one embodiment, both devices are capable of the same (e.g., pair of) roles. In one embodiment, both multiple (e.g., dual) role devices (e.g., the ports thereof) are toggling between a first role and a second role (for example, via one or more of each device's configuration channels (e.g., each device's CC1 and CC2 pins)) at (e.g., substantially) the same frequency (e.g., time rate) and/or duty cycle. Thus in certain embodiments, a physical connection is made (e.g., with a USB Type-C cable) between two or more multiple role devices but none of the devices detects the signaling to define a role (e.g., no device detects a signaling event or sends a response to acknowledge the signaling event).

Certain embodiments herein provide for a randomization of one or both of multiple role device's toggling frequency and its toggling duty cycle, for example, to minimize the probability of in sync toggling. Certain embodiments herein provide for a randomization of one or both of multiple role device's toggling frequency and its duty cycle during each cycle of toggling between different device roles. Certain embodiments herein randomize a multiple (e.g., dual) role device's toggling frequency and duty cycle, e.g., to vary the high and low times of the toggling, to reduce or eliminate the possibility of two (e.g., unique) separate devices having the same timings, e.g., over a plurality of cycles. Certain embodiments herein provide for one or more multiple (e.g., dual) role devices connected together to resolve their upstream facing data port role and downstream facing data port role and/or their power source role and power sink role faster than without randomization, e.g., as the likelihood all (e.g., both) devices are asserting (e.g., displaying) the same role at the same time is reduced (e.g., lower) or eliminated. Certain embodiments herein add more randomization to the toggling frequency and/or duty cycle of a device asserting each role indicator than a device with a fixed duty cycle and/or frequency of toggling, e.g., more randomization than a substantially fixed toggling duty cycle and/or a substantially fixed frequency of toggling that rely only on the inaccuracy (e.g., according to manufacturing tolerances) of internal timers or oscillators to provide variance (e.g., misalignment) to resolve roles and avoid the case where the toggling is in sync. Certain embodiments herein reduce role resolution times as well as reduce or avoid any occurrences where neither device sees the role defining event (e.g., a cable and/or plug insertion event). Certain embodiments herein reduce (e.g., to the end user) the resolution time significantly, e.g., the overall time from connection of the devices to usability (e.g., to allow payload data to be transmitted and received, e.g., and not role merely role resolution data transmission and receipt) is shorter.

Figure 7:
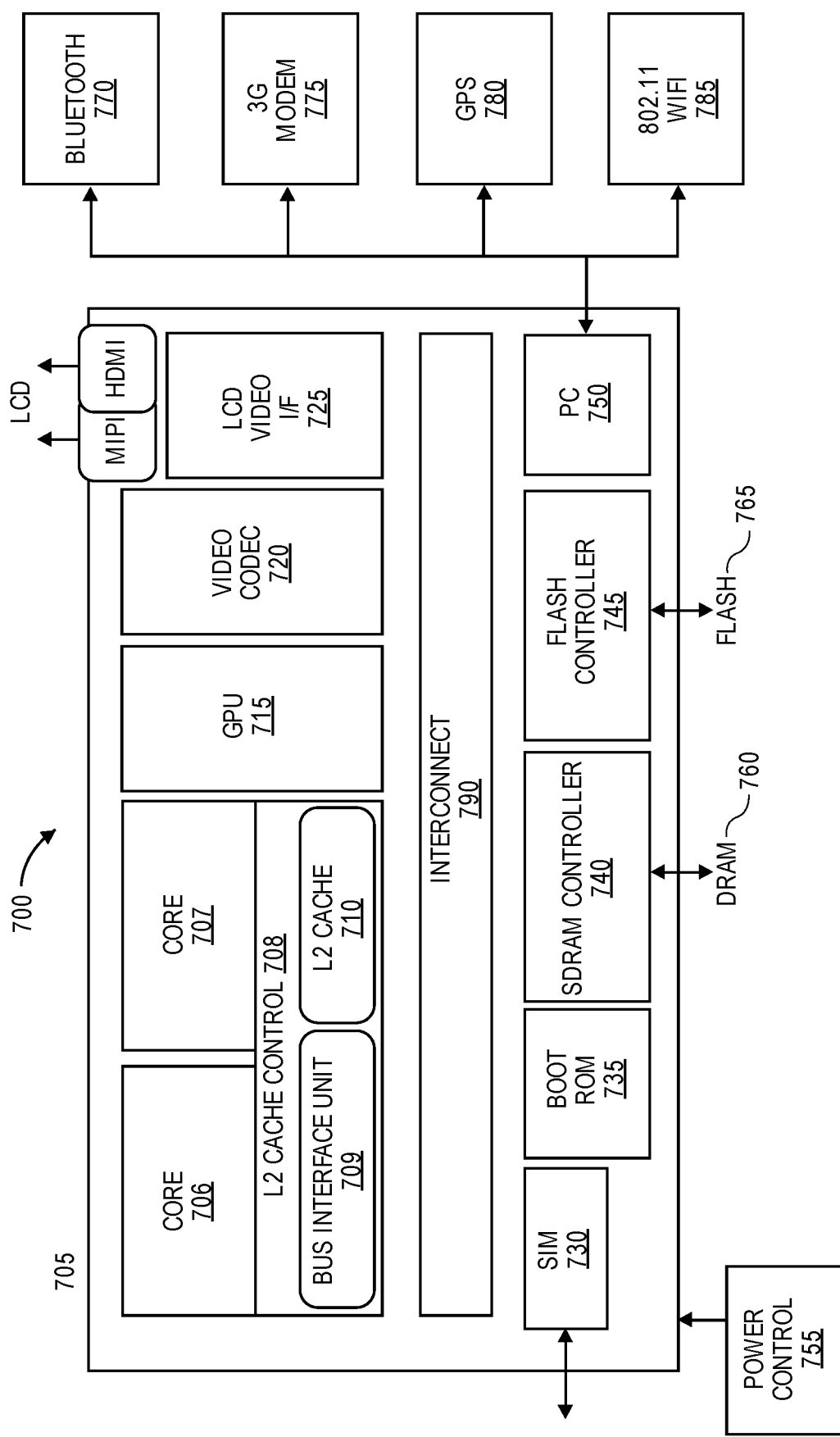
FIG. 7 is a diagram of one embodiment of a system on a chip (SOC) that may implement aspects of the embodiments.

FIG. 7 is a diagram of one embodiment of a system on-chip (SOC) design that may be utilized to implement the embodiments. As a specific illustrative example, SOC 700 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 700 includes 2 cores—706 and 707. Similar to the discussion above, cores 706 and 707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 710 to communicate with other parts of system 700. Interconnect 790 includes an on-chip interconnect, such as an IOSF, AMBA, or other interconnect discussed above, which potentially implements one or more aspects of the described embodiments.

Interconnect 790 provides communication channels to the other components, such as a Subscriber Identity Module (SIM) 730 to interface with a SIM card, a boot ROM 735 to hold boot code for execution by cores 706 and 707 to initialize and boot SOC 700, a SDRAM controller 740 to interface with external memory (e.g. DRAM 760), a flash controller 745 to interface with non-volatile memory (e.g. Flash 765), a peripheral control 750 (e.g. Serial Peripheral Interface) to interface with peripherals, video codecs 720 and Video interface 725 to display and receive input (e.g. touch enabled input), GPU 715 to perform graphics related computations, etc. Any of these interfaces may incorporate aspects of the embodiments described herein.

In addition, the system illustrates peripherals for communication, such as a Bluetooth module 770, 3G modem 775, GPS 780, and WiFi 785. Note as stated above, a UE includes a radio for communication. As a result, these peripheral communication modules are not all required. However, in a UE some form a radio for external communication is to be included.

Note that the apparatus, methods, and systems described above may be implemented in any electronic device or system as aforementioned. As specific illustrations, the figures below provide exemplary systems for utilizing the embodiments as described herein. As the systems below are described in more detail, a number of different interconnects are disclosed, described, and revisited from the discussion above. And as is readily apparent, the advances described above may be applied to any of those interconnects, fabrics, or architectures.

Figure 8:
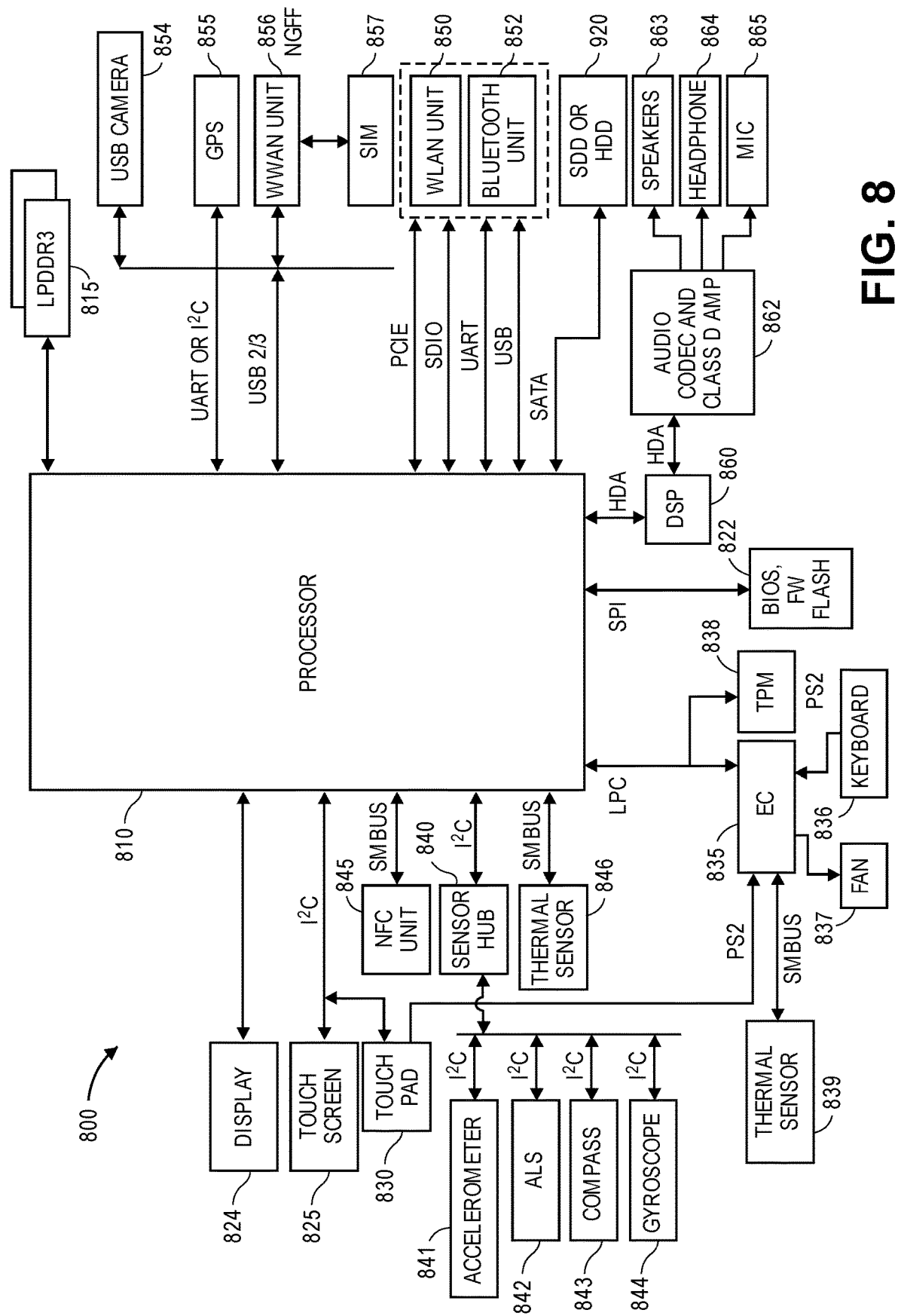
FIG. 8 is a diagram of computing system including the SOC and components that implemented the embodiments.

FIG. 8 a block diagram of components present in a computer system as an example implementation of the components of the embodiments. As shown in FIG. 8, system 800 includes any combination of components. These components may be implemented as integrated circuits (ICs), portions thereof, discrete electronic devices, or other modules, logic, hardware, software, firmware, or a combination thereof adapted in a computer system, or as components otherwise incorporated within a chassis of the computer system. Note also that the block diagram of FIG. 8 is intended to show a high level view of many components of the computer system. However, it is to be understood that some of the components shown may be omitted, additional components may be present, and different arrangement of the components shown may occur in other implementations. As a result, the embodiments described above may be implemented in any portion of one or more of the interconnects illustrated or described below.

As seen in FIG. 8, a processor 810, in one embodiment, includes a microprocessor, multi-core processor, multi-threaded processor, an ultra low voltage processor, an embedded processor, or other known processing element. In the illustrated implementation, processor 810 acts as a main processing unit and central hub for communication with many of the various components of the system 800. As one example, processor 810 is implemented as a system on a chip (SoC). As a specific illustrative example, processor 810 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 810 in one implementation will be discussed further below to provide an illustrative example.

Processor 810, in one embodiment, communicates with a system memory 815. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 820 may also couple to processor 810. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 8, a flash device 822 may be coupled to processor 810, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (TO) devices may be present within system 800. Specifically shown in the embodiment of FIG. 8 is a display 824 which may be a high definition LCD or LED panel configured within a lid portion of the chassis. This display panel may also provide for a touch screen 825, e.g., adapted externally over the display panel such that via a user's interaction with this touch screen, user inputs can be provided to the system to enable desired operations, e.g., with regard to the display of information, accessing of information and so forth. In one embodiment, display 824 may be coupled to processor 810 via a display interconnect that can be implemented as a high performance graphics interconnect. Touch screen 825 may be coupled to processor 810 via another interconnect, which in an embodiment can be an I²C interconnect. As further shown in FIG. 8, in addition to touch screen 825, user input by way of touch can also occur via a touch pad 830 which may be configured within the chassis and may also be coupled to the same I²C interconnect as touch screen 825.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self-refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass' or Gorilla Glass 2) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 810 in different manners. Certain inertial and environmental sensors may couple to processor 810 through a sensor hub 840, e.g., via an I²C interconnect. In the embodiment shown in FIG. 8, these sensors may include an accelerometer 841, an ambient light sensor (ALS) 842, a compass 843 and a gyroscope 844. Other environmental sensors may include one or more thermal sensors 846 which in some embodiments couple to processor 810 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 8, various peripheral devices may couple to processor 810 via a low pin count (LPC) interconnect. In the embodiment shown, various components can be coupled through an embedded controller (EC) 835. Such components can include a keyboard 836 (e.g., coupled via a PS2 interface), a fan 837, and a thermal sensor 839. In some embodiments, touch pad 830 may also couple to EC 835 via a PS2 interface. In addition, a security processor such as a trusted platform module (TPM) 838 in accordance with the Trusted Computing Group (TCG) TPM Specification Version 1.2, dated Oct. 2, 2003, may also couple to processor 810 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with a Universal Serial Bus specification, with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 800 can communicate with external devices in a variety of manners, including wirelessly. In the embodiment shown in FIG. 8, various wireless modules, each of which can correspond to a radio configured for a particular wireless communication protocol, are present. One manner for wireless communication in a short range such as a near field may be via a near field communication (NFC) unit 845 which may communicate, in one embodiment with processor 810 via an SMBus. Note that via this NFC unit 845, devices in close proximity to each other can communicate. For example, a user can enable system 800 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 8, additional wireless units can include other short range wireless engines including a WLAN unit 850 and a Bluetooth unit 852. Using WLAN unit 850, Wi-Fi™ communications in accordance with a given Institute of Electrical and Electronics Engineers (IEEE) 802.11 standard can be realized, while via Bluetooth unit 852, short range communications via a Bluetooth protocol can occur. These units may communicate with processor 810 via, e.g., a USB link or a universal asynchronous receiver transmitter (UART) link. Or these units may couple to processor 810 via an interconnect according to a Peripheral Component Interconnect Express™ (PCIe™) protocol, e.g., in accordance with the PCI Express' Specification Base Specification version 3.0 (published Nov. 10, 2010), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 856 which in turn may couple to a subscriber identity module (SIM) 857. In addition, to enable receipt and use of location information, a GPS module 855 may also be present. Note that in the embodiment shown in FIG. 8, WWAN unit 856 and an integrated capture device such as a camera module 854 may communicate via a given USB protocol, e.g., USB 2.0 or 3.0 link, or a UART or I²C protocol. Again the actual physical connection of these units can be via adaptation of a NGFF add-in card to an NGFF connector configured on the motherboard.

In a particular embodiment, wireless functionality can be provided modularly, e.g., with a Win™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 860, which may couple to processor 810 via a high definition audio (HDA) link. Similarly, DSP 860 may communicate with an integrated coder/decoder (CODEC) and amplifier 862 that in turn may couple to output speakers 863 which may be implemented within the chassis. Similarly, amplifier and CODEC 862 can be coupled to receive audio inputs from a microphone 865 which in an embodiment can be implemented via dual array microphones (such as a digital microphone array) to provide for high quality audio inputs to enable voice-activated control of various operations within the system. Note also that audio outputs can be provided from amplifier/CODEC 862 to a headphone jack 864. Although shown with these particular components in the embodiment of FIG. 8, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 810 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 835. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1635 may be sent to the PCH instead of the processor during the connected standby state so that the PCH can manage the wakeup processing instead of the processor. In addition, the TSC is maintained in the PCH to facilitate sustaining processor architectural functions.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Embodiments (e.g., of the mechanisms) disclosed herein may be implemented in hardware (e.g., a computer programmed to perform a method may be as described in the detailed description), software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be executed to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. The mechanisms described herein are not limited in scope to any particular programming language. The language may be a compiled or interpreted language.

One or more aspects of at least one embodiment may be implemented by representative instructions stored on a non-transitory, machine-readable medium which represents various logic within the processor, which when read by a machine causes the machine to fabricate logic to perform the techniques described herein. Such representations, which may be generally referred to as "IP cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

What is claimed is:

1. A method implemented by a computing system executing an enhanced serial peripheral interconnect (eSPI) master, the method comprising:
   receiving, by the eSPI master, an alert from an eSPI slave over an eSPI bus;
   sending, by the eSPI master, a get out of band message to the eSPI slave over the eSPI bus; and
   receiving, by the eSPI master, an out of band message from the eSPI slave, the out of band message including a connection command that specifies a universal serial bus Type-C connection or disconnection command that specifies a disconnection status change for the universal serial bus Type-C connection.

2. The method of claim 1, the method further comprising:
   processing the connection or disconnection command; and
   generating a connection or disconnection command response.

3. The method of claim 2, the method further comprising:
   sending the connection or disconnection command response to the eSPI slave via an out of band message.

4. The method of claim 1, the method further comprising:
   sending a get status message to the eSPI slave.

5. The method of claim 4, the method further comprising:
   receiving a get status reply with a status register indicating an available out of band message at the eSPI slave.

6. A system on a chip (SOC) comprising:
   an embedded multiplexor to manage communication between a display port, universal serial bus device controller and a USB host controller and a USB Type-C connector; and
   a port policy manager configured to manage out of band communication with Type-C USB ports for connection and disconnection commands.

7. The SOC of claim 6, wherein the port policy manager comprises:
   an enhanced serial peripheral interface (eSPI) executing a eSPI master.

8. The SOC of claim 6, wherein the port policy manager comprises:
   an embedded controller executing an enhanced peripheral interface (eSPI) slave.

9. The SOC of claim 8, wherein the embedded controller is configured to encapsulate a connection or disconnection command in an out of band upstream packet.

10. The SOC of claim 8, wherein the embedded controller is configured to set an enhanced serial peripheral interface (eSPI) out of band packet available in status register in response to generation of an out of band connection or disconnection command.

11. A computing system comprising:
    a set of universal serial bus (USB) Type-C connectors; and
    a processor coupled to the set of USB Type-C connectors, the processor including an embedded multiplexor to manage communication between a display port, universal serial bus device controller and a USB host controller and a USB Type-C connector, the processor to execute a port policy manager to manage out of band communication with the Type-C USB ports for connection and disconnection commands.

12. The computing system of claim 11, further comprising:
an enhanced serial peripheral interface (eSPI) executing a eSPI master.

13. The computing system of claim 11, further comprising:
an embedded controller executing an enhanced peripheral interface (eSPI) slave.

14. The computing system of claim 13, wherein the embedded controller is configured to encapsulate a connection or disconnection command in an out of band upstream packet.

15. The computing system of claim 13, wherein the embedded controller is configured to set an enhanced serial peripheral interface (eSPI) out of band packet available in status register in response to generation of an out of band connection or disconnection command.

* * * * *